United States Patent
Ishibashi et al.

(12) 
(10) Patent No.: US 6,455,143 B1
(45) Date of Patent: Sep. 24, 2002

(54) MOLDING MATERIAL AND PRODUCTION PROCESS

(75) Inventors: Soichi Ishibashi; Tetsuyuki Kyono, both of Ehime (JP)

(73) Assignee: Toray Industries Inc. (JP)

( * ) Notice: Subject to any disclaimer, the term of this patent is extended or adjusted under 35 U.S.C. 154(b) by 0 days.

(21) Appl. No.: 09/101,251

(22) PCT Filed: Nov. 6, 1997

(86) PCT No.: PCT/JP97/04049

§ 371 (c)(1),
(2), (4) Date: Jul. 15, 1998

(87) PCT Pub. No.: WO98/20076

PCT Pub. Date: May 14, 1998

(30) Foreign Application Priority Data

Nov. 6, 1996 (JP) ............................................. 8-293633

(51) Int. Cl.[7] .............................. B32B 17/12; D02G 3/00
(52) U.S. Cl. ................................ 428/294.1; 428/300.1; 428/300.7; 428/301.4; 428/297.4; 428/373; 428/375; 428/376; 428/377; 428/397; 428/293.4; 428/296.4; 428/296.7; 428/297.1; 428/368; 428/370
(58) Field of Search ........................... 428/300.7, 301.4, 428/300.1, 297.4, 373, 375, 376, 377, 397, 293.4, 294.1, 296.4, 296.7, 297.1, 368, 370

(56) References Cited

U.S. PATENT DOCUMENTS

| | | | | |
|---|---|---|---|---|
| 3,953,648 A | * | 4/1976 | Marzocchi | 428/378 |
| 4,549,920 A | * | 10/1985 | Cogswell et al. | 156/181 |
| 4,664,971 A | | 5/1987 | Soens | |
| 4,960,642 A | | 10/1990 | Kosuga et al. | |
| 5,397,608 A | | 3/1995 | Soens | |
| 5,789,073 A | * | 8/1998 | Odagiri et al. | 428/283 |
| 6,027,794 A | * | 2/2000 | Ozaki et al. | 428/297.7 |

FOREIGN PATENT DOCUMENTS

| | | | | |
|---|---|---|---|---|
| EP | 0 063403 A1 | * | 12/1982 | B29B/3/02 |
| EP | 0 564097 A1 | * | 4/1993 | C08J/5/06 |
| JP | 51-100142 | | 9/1976 | |
| JP | 5-124036 | | 5/1993 | |
| JP | 6-49181 | | 2/1994 | |

* cited by examiner

Primary Examiner—Elizabeth M. Cole
Assistant Examiner—Arti R. Singh
(74) Attorney, Agent, or Firm—Schnader Harrison Segal & Lewis LLP

(57) ABSTRACT

A molding material comprises at least the following components A, B and C, with the component C arranged to contact a composite comprising the components A plus B. The components are elongated members identified as:

A A continuous reinforcing fiber bundle,
B A thermoplastic polymer or oligomer having a weight average molecular weight of 200 to 50,000 and a melt viscosity lower than that of the component C, and
C A thermoplastic resin having a weight average molecular weight of 10,000 or more.

35 Claims, 3 Drawing Sheets

MOLDING MATERIAL AND PRODUCTION PROCESS

TECHNICAL FIELD

The present invention relates to a long fiber reinforced thermoplastic resin material. In more detail, the present invention relates to a molding material which can be easily produced and contains a reinforcing fiber bundle which is well dispersed. The molded product is obtained by molding such as injection molding. This invention also relates to a production process which produces a resin composition having good flowability. The invention also relates to molded products obtained from the process.

BACKGROUND ART

Fiber reinforced composite materials containing a continuous reinforcing fiber bundle, or containing relatively long discontinuous reinforcing fibers, as reinforcing fibers in a thermoplastic resin matrix, are publicly known. These composite materials have such features as high toughness, easy recyclability and short molding cycle because of the applicability of such molding methods as injection molding and stamping, but for several reasons have not been used so widely.

The reasons are as described below. It is well known that the impregnation of a molten resin into a fiber bundle is more difficult when the melt viscosity of the resin is higher. A thermoplastic resin that has excellent mechanical properties generally has a high molecular weight and a very high melt viscosity. A fiber reinforced composite material having such a high molecular weight thermoplastic resin as the matrix is confronted with problems of low productivity, and that the production cost is very high, since it is difficult to impregnate a fiber bundle into a thermoplastic resin. On the other hand, the use of a thermoplastic resin of low molecular weight (low viscosity), to allow easy impregnation, greatly lowers the mechanical properties of the composite material.

As a method for impregnating a continuous fiber bundle into a highly viscous thermoplastic resin, for example, a process called pultrusion is used, in which a fiber bundle is immersed, opened and rubbed in a molten resin, with pressure applied to the resin for mechanical impregnation. In such a method, for impregnation into a resin having a high viscosity, say, exceeding 500 poises, the fiber bundle must be taken up at a very low speed of 10 m/min or less. Several such mechanical impregnation methods are known, but they cannot fundamentally solve the problem of impregnation and do not allow a take-up speed of higher than tens of meters per minute.

Other proposed impregnation methods include a thermoplastic resin being diluted by addition of a solvent, to lower its viscosity, for impregnation with a continuous fiber bundle, and the solvent is removed in a subsequent step. A thermoplastic resin emulsion or dispersion can be impregnated by a continuous fiber bundle, and the medium is removed. A thermoplastic resin powder can be introduced into a fiber bundle in a fluidized bed, and heated and melted to achieve impregnation. However, it can be generally judged that these methods are only capable of low productivity.

On the other hand, methods for improving the problem of impregnability by modifying the surfaces of the fibers are also proposed. It is intended to improve the wettability between the fibers and the thermoplastic resin at the time of resin impregnation by modifying the surfaces of the fibers by applying a sizing agent or coupling agent, etc.

As one of these methods, Japanese Patent Laid-Open (Kokai) No. 61-236832 discloses that a composite material having improved mechanical properties can be obtained by introducing a second thermoplastic polymer between a standard thermoplastic polymer and fibers, for improving their wettability. However, this Kokai does not state the specific amount of the second thermoplastic polymer introduced between the standard polymer and the fibers, and does not clarify the effect of promoting impregnation, though it is stated that the product's mechanical properties can be improved when a thermoplastic polymer having low wettability is impregnated. Furthermore, even though the melt viscosity of the second thermoplastic polymer is referred to in the Kokai, specific ranges of molecular weights and melt viscosities of the second thermoplastic polymer are not specified, and it cannot be known whether the material productivity can be actually improved. Moreover, though this method can improve the wettability between the fiber bundle and the matrix, it is not stated at all whether the method is intended to improve the dispersibility of the reinforcing fibers in the molded product.

It is also attempted to achieve molding by impregnation of a thermoplastic resin with a reinforcing fiber bundle and dispersion of the fibers simultaneously by molding them into a final product form. This is for increasing the productivity of the thermoplastic composite material in the entire process ranging from the material preparation to molding. When a thermoplastic molding material is molded, usually a relatively high temperature and pressure are applied. For example, in the case of injection molding, the molding material is heated in a cylinder in the plasticization step, and kneaded and pressurized by a screw. Also, in press molding, a high temperature and pressure are also applied. This provides a relatively favorable condition for impregnating a fiber bundle into a thermoplastic resin. The idea of supplying a reinforcing fiber bundle and a high molecular weight thermoplastic resin destined to be a matrix, into a molding machine for achieving impregnation, fiber dispersion and molding simultaneously, has existed for a long time as direct injection molding. According to this method, it is not necessary to produce a molded material shaped like pellets in which fibers are impregnated with a resin. In such a case it can be considered that the productivity could be greatly improved. However, actually, for example in the case of direct injection molding, impregnation and fiber dispersion are not sufficient. Alternatively, to achieve sufficient impregnation and fiber dispersion, a molding machine having a special screw form to achieve extremely high kneading must be used. So, a general purpose injection molding machine cannot be used, and furthermore, when the material is powerfully or highly kneaded, the desirable long fibers are broken into short fibers by the existing high shearing force, and the molded product cannot manifest the intended high mechanical properties. As described above, there has been no long fiber reinforced thermoplastic composition material with excellent productivity and excellent molding, and also wherein the product has high mechanical properties.

It is publicly known to modify a thermoplastic resin using various additives. The use of an aromatic modified terpene resin as an additive is stated in Japanese Patent Laid-Open (Kokai) Nos. 2-199164 and 7-11066. In these techniques, it is intended to improve the adhesiveness or paintability of polyphenylene ether or polyolefin resin, which itself has poor adhesiveness or paintability. In the case of a polyamide resin, such modification is not required so much, since the resin has high adhesiveness and paintability. However, when a polyamide resin of high molecular weight is used, or when a polyamide resin containing a large amount of a filler or flame retardant to achieve a higher elastic modulus or higher flame retardancy is used, the flowability during molding often becomes insufficient. It has not been practiced to use a resin that is similar in structure to an aromatic modified terpene resin as an additive to improve flowability during molding without greatly impairing the physical properties peculiar to a polyamide.

An object of the present invention is to provide a fiber reinforced thermoplastic resin molding material, which allows easy impregnation of a low molecular (low viscous) thermoplastic resin (high productivity) and allows high mechanical properties to be achieved when a high molecular weight thermoplastic resin is used as the matrix, and which allows a high viscous matrix to be impregnated into the fibers when the material is plasticized for molding, and which allows fibers to be well dispersed in the molded product. It is also an object to provide a production process thereof. Other objects of the present invention are to provide a resin composition that has good flowability, and molded products obtained from the molding material and the resin composition.

DISCLOSURE OF THE INVENTION

To achieve the above objects, the molding material of the present invention is constituted as follows.

A molding material, comprising at least the following components A, B and C, wherein the component C is arranged to contact a composite consisting of the components A and B.

The component A is a continuous reinforcing fiber bundle

The component B is a thermoplastic polymer or oligomer having a weight average molecular weight of 200 to 50,000, and having a melt viscosity that is lower than that of the component C, and The component C is a thermoplastic resin that has a weight average molecular weight of 10,000 or more.

The process for producing the molding material of the present invention is constituted as follows.

A process for producing said molding material, comprising the steps of impregnating the fiber bundle component A with the polymeric component B heated and melted to have a viscosity of 100 poises or less, to form a composite; arranging the component C which is molten to a viscosity of 500 poises or more, in contact with said composite; and cooling the resulting material A+B+C to room temperature.

The polyamide based resin composition of the present invention is constituted as follows. It is a polyamide based resin composition consisting of the following components D and E, with the component D present as 0.5 to 40 parts by weight per 100 parts by weight in total of the resin composition, and component D is an oligomer obtained by condensing phenol or a phenol derivative (precursor a) with an aliphatic hydrocarbon having two double bonds (precursor b), and wherein component E is a polyamide resin.

The molded product of the present invention is obtained by molding said molding material or said polyamide based resin composition.

The pellets to be injection-molded in accordance with the present invention comprise said molding material or said polyamide based resin composition.

A molded product of the present invention, as another version of the invention, is obtained by injection-molding said pellets.

Figure 1:
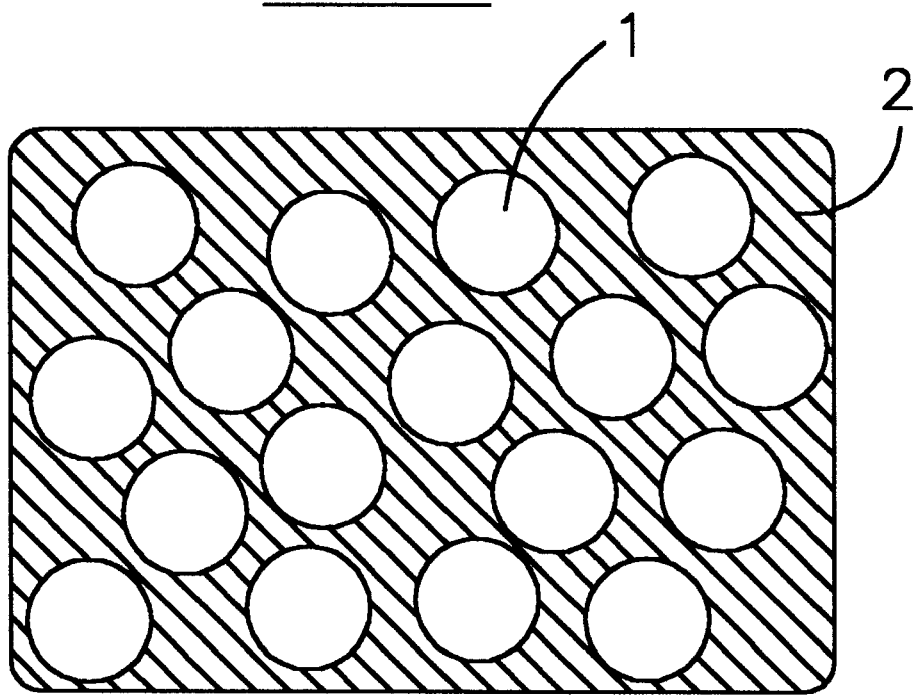
FIG. 1 is an illustration showing a cross section of a composite that is positioned in the molding material of the present invention, as an example.
Figure 2:
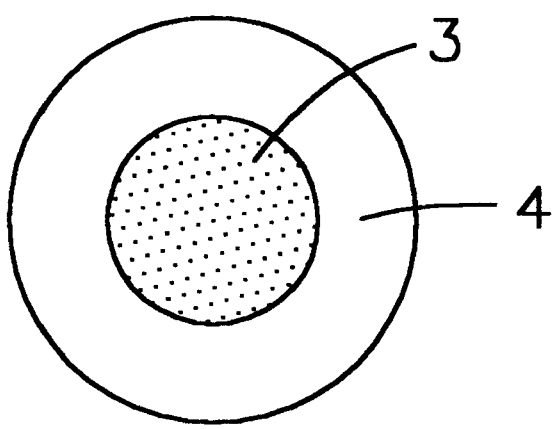
FIG. 2 is an illustration showing a cross section of a molding material of the present invention, as an example.
Figure 3:
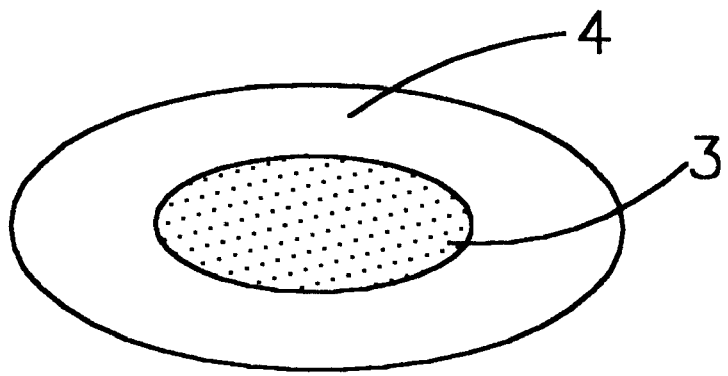
FIG. 3 is an illustration showing a cross section of a molding material of the present invention, as another example.

In the drawings, the reference number 1 denotes a single filament of the component A; 2 denotes the component B; 3 denotes a composite consisting of the components A and B; and 4 denotes the component C.

MOST PREFERRED EMBODIMENTS OF THE INVENTION

The present invention is described below in more detail.

The molding material of the present invention consists of at least the following three components. Component A is a continuous reinforcing fiber bundle, to provide high mechanical properties to a molded product as a reinforcing material of a composite material. Component C is a matrix resin with a relatively high viscosity and high physical properties such as toughness. The component C is impregnated into the component A after molding, and is bonded to the reinforcing material, acting to hold it strongly. Component B is a thermoplastic polymer or oligomer having a relatively low viscosity and forms a composite with the component A, and helps the impregnation of the matrix resin (component C) into the reinforcing fiber bundle (component A) during molding, and also helps the dispersion of the reinforcing fibers into the matrix, acting as an impregnation and dispersion aid.

The components A and B form a composite. The style of the composite A+B3 is as shown in FIG. 1, and the clearances between the individual single filaments of its continuous fiber bundle (component A1) are filled with the component B2. That is, the component A fibers 1 are dispersed like "islands in the sea" of the component B2. Concretely, the component B2 is thermally molten and impregnated into the component A1, to form the composite A+B3.

Figure 4:
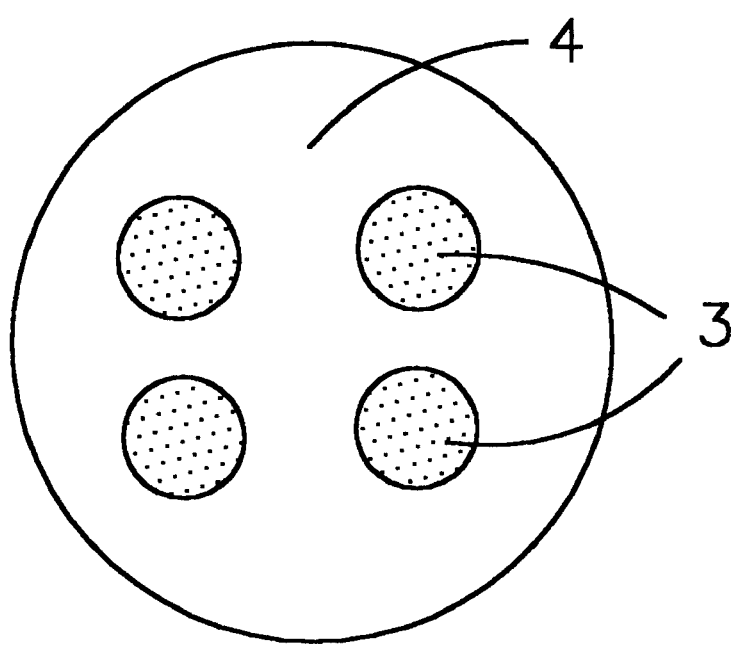
FIG. 4 is an illustration showing a cross section of a molding material of the present invention, as a further other example.
Figure 5:
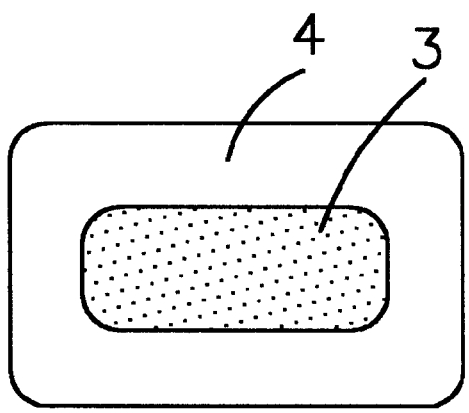
FIG. 5 is an illustration showing a cross section of the molding material of the present invention, as a still further other example.
Figure 6:
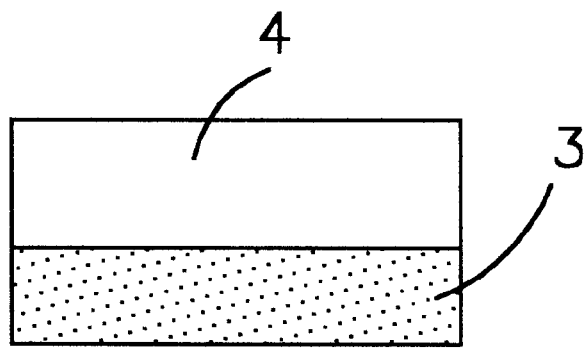
FIG. 6 is an illustration showing a cross section of the molding material of the present invention, as a still further other example.
Figure 7:
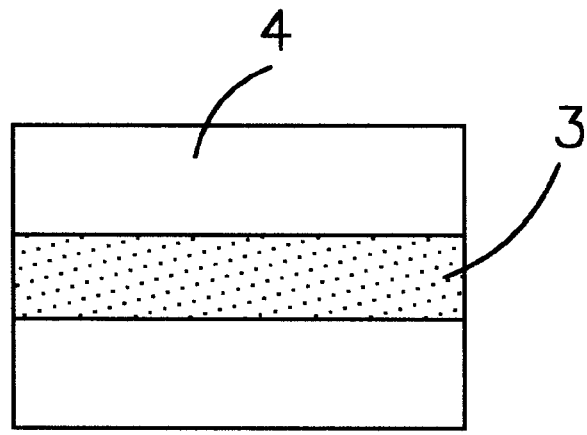
FIG. 7 is an illustration showing a cross section of the molding material of the present invention, as a still further other example.

FIGS. 2 to 7 typically show the forms of sections of the molding materials of the present invention as examples. The form of the section of each molding material is not limited to those illustrated here, so long as the component C4 is arranged to contact the composite A+B3. It is preferable that, as shown in FIGS. 2 to 5, the component C4 is arranged to surround the composite A+B3, or that as shown in FIGS. 6 and 7, the composite A+B3 and the component C4 are arranged in layers. When a plurality of composite strands are covered with the component C4 as shown in FIG. 4, it is desirable that the number of composite strands is 2 to about 6.

It is desirable that the composite A+B3 and the component C are bonded at the border. A case where the component C4 partially penetrates the composite 3 near the border in a compatible condition, or a case where the component C4 is impregnated into the component A1 is acceptable.

The molding material is required to be continuous in the longitudinal direction with almost the same sectional form. Depending on the molding method, such a continuous molding material can also be cut at a certain length.

The molding material of the present invention can be formed into a final molded product by mixing the components A, B and C by such a method as injection molding or press molding. For handling convenience of the molding material, it is important that the respective components are not separated and keep the form described above till molding is effected. Since the component B has a low molecular weight, it often is a solid that is relatively fragile and liable to be crushed at room temperature, or is a liquid. So, it is desirable that the component C having a high molecular weight is arranged to protect the composite, so that the component B is not crushed or scattered by shock or abrasion, etc. during transport or handling.

For this purpose, it is preferable that, as shown in FIGS. 2 to 5, the component C4 surrounds the composite 3 consisting of the components A1 and B2, or that, as shown in FIGS. 6 and 7, the composite 3 and the component C4 are arranged in layers. If the components are arranged as described here, the molding material is able to hold its form since the component C4 having a high molecular weight surrounds the component B2 or is arranged on the surface that is likely to be abradable.

The respective components of the molding material of the present invention are further described below.

The component B is a thermoplastic polymer or oligomer having a weight average molecular weight of 200 to 50,000 and a melt viscosity that is lower than that of the component C, and is impregnated into the component A, to form the composite. When the thermoplastic resin having a high viscosity as the matrix is impregnated in to the fiber bundle, the component B acts as an impregnation and dispersion aid to help the impregnation and the dispersion of the fibers into the matrix. The reinforcing fiber bundle (component A) is impregnated with the component B that has a low viscosity. So, for example in the step of molding into the final form by injection molding or press molding, etc., when the molding material is heated, pressurized and kneaded, the component B helps the matrix to be impregnated into the fiber bundle (component A) and improves the dispersibility of the reinforcing fibers in the matrix.

The mechanism is as described below. The diameters of the single filaments constituting the reinforcing fiber bundle are as very small as 7 to 10 $\mu$m in the case of carbon fibers, and 20 $\mu$m or less even in the case of glass fibers. This means that the fiber bundle has a surface area that is far larger than it appears to have. Impregnating a fiber bundle with a melt with a certain viscosity is done by pressing the melt into the slight clearances between the single filaments, by wetting all the large surface area of the fibers while expelling the air existing in the clearances from the space between the single filaments. The difficulty (the time required for impregnation) can be simply considered to be proportional to the viscosity of the melt. In the present invention, the fiber bundle A is wetted beforehand by the material of component B that has a smaller melt viscosity than the material (component C) to be finally combined with A+B, and has the component B packed in the clearances between the single filaments A, i.e., is impregnated with component B. So, even if the melt (component C) to be finally impregnated has a viscosity that is high to some extent, impregnation is quite easy. The reason is that the impregnation with component C can be achieved by simply replacing or mixing the material B impregnated beforehand between in the fibers and the material to be impregnated, without the need of expelling air out of the structure. If the chemical affinity of the component B to the reinforcing fiber bundle (component A) and the thermoplastic resin (component C) as the matrix is taken into account, the effect can be improved. Especially when the component B has the nature of a surfactant, homogeneously dispersing the reinforcing fibers into the molded product, when the molding material is plasticized for molding, can be readily obtained.

The use of the component B is different in concept from the use of a coupling agent or sizing agent generally used for surface treatment of reinforcing fibers. That is, the amount of the coupling agent or sizing agent used for treatment is usually as small as about 0.05 to 10 wt %, and it is intended to be applied only to the surfaces of the fibers. Therefore, the coupling agent or sizing agent is not impregnated into the fiber bundle beforehand. The component A can be subjected to any publicly known surface treatment or can be coated with a coupling agent or sizing agent to achieve the intended effect as achieved conventionally. However, since the fiber bundle is impregnated with the component B which is a thermoplastic polymer or oligomer, the amount of the sizing agent, etc. used for treatment can be a required minimum.

When the molding material in accordance with this invention is produced, the component B is impregnated into the component A beforehand. The component B can be easily impregnated into the continuous fiber bundle (component A), and in the process of continuously impregnating the fiber bundle, the fiber bundle can be run at a high speed of, say, 10 m/min or more, giving excellent productivity. Furthermore, also in the impregnation process, it is not necessary to use a complicated apparatus for greatly opening the fibers or rubbing the fibers against bars so much as to damage the fibers, or to apply a high pressure to the thermoplastic polymer or oligomer. It is not necessary, either, to adopt a method of low productivity such as diluting the thermoplastic polymer or oligomer for lowering its viscosity for impregnation and then removing the solvent, or producing an emulsion or dispersion for impregnation and then removing the medium. If the impregnation apparatus is optimized, it is achievable that the fiber bundle runs at a speed of tens of meters per minute when the thermoplastic polymer or oligomer (component B) is molten and impregnated, to provide a large advantage that when the molding material is produced, the resin impregnability determines the productivity.

If the weight average molecular weight of the component B is smaller than 200, it is easily volatilized when heated, to cause such defects as voids in the molded product, and to greatly lower the physical properties of the matrix resin after completion of molding. On the contrary, if the weight average molecular weight of component B is larger than 50,000, the melt viscosity becomes high, and makes the impregnation into the fiber bundle difficult, lowering the productivity of the molding material. A more desirable range of the weight average molecular weight of the component B is 200 to 14,000, and a further more desirable range is 200 to 1,000. To measure the weight average molecular weight, gel permeation chromatography (GPC) is used, and a low angle light scattering photometer (LALLS) using a laser as the detector is used. As for the relation of melt viscosities, it is only required that the melt viscosity of the component B is smaller than that of the component C at the temperature of molding.

It is desirable that the melt viscosity of the component B is 100 poises or less. More desirable is 20 poises or less. If the melt viscosity is higher than 100 poises, the impregnation into the component A becomes difficult, lowering the productivity of the molding material. It is desirable that the melt viscosity of the component C is 500 poises or more. The term "melt viscosity" refers to the viscosity at the Vicat softening temperature of the sample +30° C. orthe melting point +30° C. If the material is crystalline and has a clear melting point, the melting point +30° C. should be adopted, and in the other cases, the softening temperature +30° C. should be adopted. The melt viscosity is measured using a capillary rheometer according to JIS K 7199. The shear rate for measurement is $10^3$ $s^{-1}$. The Vicat softening temperature is measured according to JIS K 7206, and the melting point is measured according to DSC.

The component B is mixed and diffused in the component C (matrix) in the molded product. If the components B and C are a combination amenable to easy mixing, the component B is excellent in function as an impregnation and dispersion aid. More concretely, if the components B and C have chemical affinity and desirably are compatible, the effect is large. If both have moderate chemical affinity and reactivity even in a non-compatible combination, the component B is micro-dispersed into the component C, to manifest a practically sufficient effect as an impregnation and dispersion aid. Whether the components B and C have chemical affinity and tend to be compatible with each other can be judged to some extent, using the solubility parameter. The solubility parameter is described in detail in Saburo Akiyama, Takashi Inoue and Toshio Nishi, "Polymer Blends" (CMC). Several methods are known for determining the solubility parameter of a polymer, and for comparison, the same method is required to be used. Specifically, it is desirable to use Hoy's method for easy calculation (see the above book). If the solubility parameter values of the two liquids are closer, the combination can be said to be more compatible. From this point of view, if the solubility parameter of the component B is $\delta 1$ and the solubility parameter of the component C is $\delta 2$, then it is preferable that the absolute value of the difference between the solubility parameter values $|\delta 1 - \delta 2|$ is smaller than 3.5.

In the mixing of the component B with a low viscosity and the component C, if the component B is not suitable as an impregnation and dispersion aid, the resulting impact resistance may decline greatly. From this point of view, when the component B content in the molding material is 10 wt %, it is preferable that the Izod impact value of the molded product obtained by molding the molding material accounts for 60% or more of the Izod impact value of the molded product excluding the component B from the components of the molding material. More preferable is 75% or more. The Izod impact value is measured according to JIS K 7110.

The component B can contain a flame retardant, weathering improver, antioxidant, thermal stabilizer, ultraviolet light absorber, plasticizer, lubricant, colorant, compatibility improver, conductive filler, etc., to suit the required properties of the molded product to be obtained.

It is desirable that the component A is perfectly impregnated with the component B. Theoretically, if the fibers (component A) are arranged to form a hexagon with the closest packing and the clearances between the fibers are packed with the component B, then the amount of the component B is smallest. If the fibers are assumed to be a complete circle in section and equal in diameter, the volumetric content of the component A is 90.7% ($\pi(2 \times 3^{1/2})$). It is technically difficult to actually achieve this volumetric content without forming any voids. However, even when a certain quantity of voids exists or when the volumetric content is so high as to form non-impregnated portions in calculation, the present invention has the effect of promoting impregnation and fiber dispersion. Considering that, in order to prevent the mechanical properties of the molded composite material from declining, it is preferable that the volumetric content of the component A in the composite is 40% or more. If the volumetric content exceeds 95%, the clearances between single filaments contain more portions that are not packed with the component B, sharply lowering the impregnation promoting effect as a result. So, it is preferable that the volumetric content of the component A is 95% or less. A more preferable volumetric content range is 80 to 95%.

As described before, it is desirable that the component A is perfectly impregnated with the component B, but actually it is difficult. So, the composite consisting of the components A and B contains some voids. Especially when the component A content is large, more voids exist, and even if some voids exist, the present invention can manifest the effect of promoting the impregnation, and fiber dispersion. However, if the void volume exceeds 40%, the effect of promoting the impregnation and fiber dispersion is remarkably decreased. So, it is preferable that the void volume is 0 to 40%. A more desirable void volume range is 20% or less. The void volume is obtained by measuring the composite portion according to the testing method of ASTM D 2734.

The chemical composition of the material suitable as the component B is described below.

The surfaces of the reinforcing fibers as the component A are usually treated, considering the adhesiveness to the matrix resin, etc., and furthermore, usually coated with a highly polar coupling agent and sizing agent. For this reason, considering the affinity with the surfaces of the fibers, it is desirable that the thermoplastic polymer or oligomer used as the component B has polar groups. The polar groups include, for example, amino groups, hydroxyl groups, carboxyl groups, etc., and can be selected, considering the affinity with the functional groups, etc. on the fiber surfaces. If the polarity of the matrix resin used as the component C is low, as in the case of a polyolefin, etc., it is desirable that the component B include portions of an aliphatic hydrocarbon with low polarity, as well as the polar groups. Since the component B is introduced beforehand in the interfaces between the fibers and the matrix, the component B, with both high polar portions and low polar portions, also functions like a surfactant, and especially contributes to improving fiber dispersibility at the time of molding.

As described before, the compatibility between the components B and C is an important factor. Considering the affinity between the components B and C, if the ratio of the high polar molecules and the low polar molecules in the component B is properly controlled, the component B has high affinity with the surfaces of both the fibers and the matrix C.

A compound which is especially excellent as the component B is an oligomer obtained by adding phenol or a phenol derivative (precursor a) and an aliphatic hydrocarbon having two double bonds (precursor b). The addition reaction can be effected in the presence of a strong acid or Lewis acid.

Furthermore, the component B can be obtained by causing the precursor a and a compound capable of producing the precursor b in the reaction system to react with each other under the same conditions.

It is preferable that the phenol derivative used as the precursor a has one to three substituent groups selected from alkyl groups (particularly those with 1 to 9 carbon atoms), halogen atoms (particularly chlorine and bromine) and hydroxyl groups, on the benzene nucleus of phenol. Such phenol derivatives include, for example, cresol, xylenol, ethylphenol, butylphenol, t-butylphenol, nonylphenol, 3,4, 5-trimethylphenol, chlorophenol, bromophenol, chlorocresol, hydroquinone, resorcinol, orcinol, etc.

Compounds that are especially preferable as the precursor a are phenol and cresol. Two or more compounds can be used as the precursor a.

The precursor b is an aliphatic hydrocarbon with two double bonds, and may have one or more cyclic structures.

Compounds without any cyclic structure which can be used as the precursor b include butadiene, isoprene, pentadiene, hexadiene, etc. Compounds with one or more cyclic structure which can be used as the precursor b include monocyclic compounds such as cyclohexadiene, vinyicyclohexene, cycloheptadiene, cyclooctadiene and monocyclic monoterpene represented by molecular formula $C_{10}H_{16}$ (dipentene, limonene, terpinolene, terpinene, phellandrene), dicyclic compounds such as 2,5-norbornadiene, tetrahydroindene and dicyclic sesquiterpene represented by molecular formula $C_{15}H_{24}$ (cadinene, selinene, caryophyllene, etc.), tricyclic compounds such as dicyclopentadiene, etc.

The compounds which can produce the precursor b in the reaction system include pinene and camphene which can produce dipentene by isomerization.

As the precursor b, a compound having 6 to 15 carbon atoms is preferable, and a compound having one or more cyclic structures is also preferable. A compound having one or more cyclic structures is moderately restrained in molecular motion and becomes relatively rigid. If the component B having such a structure is used, the molded product with the component B dispersed in the component C does not greatly decline in elastic modulus. Compounds especially preferable as the precursor b include monocyclic monoterpene represented by molecular formula $C_{10}H_{16}$ and dicyclopentadiene. A general molecular structure of the addition product of monocyclic monoterpene and phenol is shown in formula I, as an example.

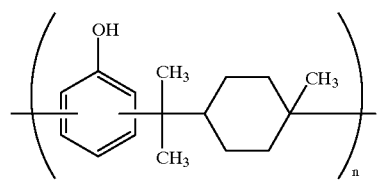

I

A plurality of compounds can be used as the precursor b or as compounds producing the precursor b in the reaction system.

A composition which is especially excellent as the component B in the molding material of the present invention is such that a product having one molecule of the precursor b added to two molecules of the precursor a (hereinafter called a "2:1 addition product") accounts for 40 wt % or more in the component B. Since one molecule of a low polar aliphatic hydrocarbon is added to two molecules of a high polar phenol or phenol derivative, the composition as a whole is relatively high in polarity and is excellent in the affinity with a highly polar polyamide with amido groups, etc. It is only required that the 2:1 addition product is contained as a main ingredient in an amount of 40 wt % or more in the component B, and for example, a 1:1 addition product, a 2:2 addition product and other impurities may be additionally present. As an example of the main ingredient of the component B, the molecular structure of the addition product between dipentene as monocyclic monoterpene and phenol is shown in formula II.

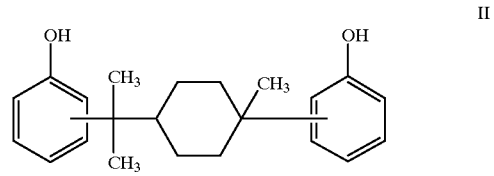

II

The reinforcing fibers used as the component A are not especially limited. Fibers having a high strength and elastic modulus such as carbon fibers, glass fibers, polyaramid fibers, alumina fibers, silicon carbide fibers or boron fibers can be used. Two or more kinds of them can also be used as a mixture. Among them, carbon fibers are preferable since they are excellent in the effect of improving mechanical properties.

More preferable carbon fibers are 0.05 to 0.4 in the surface chemical function (O/C) obtained as a ratio of the number of oxygen atoms (O) to the number of carbon atoms on the fiber surfaces measured by the X-ray photoelectron spectroscopy. An O/C ratio of smaller than 0.05 means that the number of functional groups contributing to the adhesion to the matrix resin on the surfaces of the carbon fibers is very small. If the adhesion between the carbon fibers and the matrix resin is poor, the molded product cannot be expected to have high mechanical properties. On the contrary, an O/C ratio of larger than 0.4 means that the surfaces of carbon fibers are oxidized more than required, and that the crystal structure of carbon is destroyed to form a fragile layer on the surface of each fiber. Also in this case, as in the case of too low O/C, destruction is liable to occur near the surface layers of the fibers, and the molded product cannot be expected to have good mechanical properties. If the O/C ratio is kept in the above range, preferable effects can be provided not only for the adhesion at the interfaces between the fibers and the matrix but also for the affinity for impregnation with the component B and the dispersibility of fibers at the time of molding.

The surface chemical function (O/C) is determined according to the following procedure by the X-ray photoelectron spectroscopy. At first, the carbon fibers (bundle), from which the sizing agent, etc. are removed by a solvent, are cut and spread on a sample holder made of copper, and at a photoelectron escape angle of 90°, with Mg K 1, 2 used as the X-ray source, the sample chamber is internally kept at $1 \times 10^{-8}$ Torr. For correction of the peak due to electrification at the time of measurement, the kinetic energy (K.E.) of the main peak of C1S is set at 969 eV. The C1S peak area is obtained by drawing a straight base line in a K. E. range of 958 to 972 eV, and the O1S peak area is obtained by drawing a straight base line in a K. E. range of 714 to 726 eV. The surface chemical function (O/C) is calculated as a ratio of numbers of atoms from the ratio of the O1S peak area to the CLS peak area using the sensitivity correction value peculiar to the instrument.

The thermoplastic resin used as the component C has a weight average molecular weight of 10,000 or more. If the weight average molecular weight is less than 10,000, the mechanical properties of the finally obtained molded product of the composite material decline. The component C is not especially limited so long as it has a weight average molecular weight of 10,000 or more. The compounds which can be used as the component C include polyamides (nylon 6, nylon 66, etc.) polyolefins (polyethylene, polypropylene, etc.), polyesters (polyethylene terephthalate, polybutylene terephthalate, etc.), polycarbonates, polyamidimides, polyphenylene sulfide, polyphenylene oxide, polysulfones, polyether sulfones, polyether ether ketones, polyether imides, polystyrene, ABS, crystalline polyesters, acrylonitrile styrene copolymer, etc. and their mixtures. Copolymers such as nylon 6 nylon 66 copolymer can also be used. Furthermore, to meet the required properties of the molded product, the component C can contain a flame retardant, weathering improver, antioxidant, thermal stabilizer, ultraviolet light absorbent, plasticizer, lubricant, colorant, compatibility improver, conductive filler, etc.

Compounds especially suitable for use as the component C of the molding material of the present invention include polyamides, polyolefins and polycarbonates. Among them, nylon 6, nylon 66 and nylon 6 nylon 66 copolymer have excellent affinity with the oligomer (component B) obtained by condensation of phenol or a phenol derivative and an aliphatic hydrocarbon with two double bonds, and are excellent since the mechanical properties do not decline even after mixing.

It is preferable that the molding material of the present invention is cut at a length of 1 to 50 mm when used. If the molding material is discontinuous, it is higher in flowability and very high in formability at the molding. If the length is shorter, the moldability such as formability and flowability increases, but if the cut length is less than 1 mm, the fiber reinforcing effect sharply declines since the reinforcing fibers are too short. If the cut length is longer than 50 mm, the moldability declines greatly though the reinforcing effect increases. A more desirable cut length range is 3 to 12 mm.

The molding material of the present invention can also be used as a continuous long material, depending on the forming method. For example, it can be formed as a thermoplastic yam prepreg, and it can be wound around a mandrel while being heated, to obtain a roll form. Furthermore, the molding material of the present invention as a plurality of strands can be paralleled in one direction and heated to be fused, to produce a unidirectional thermoplastic prepreg. The prepreg can be applied in fields where a high strength and elastic modulus are required.

For producing the molding material of the present invention, the component A is impregnated with the component B heated to be molten to have a viscosity of 100 poises or less, for forming a composite, and then the component C molten to have a viscosity of 500 poises or more is arranged to contact the composite. Subsequently, the entire composite on is cooled to room temperature (about 15 to 25° C.). For example, the production process can comprise three steps: a step of depositing the heated and molten component B onto the continuous fiber bundle (component A) by a predetermined amount per unit length (hereinafter called the aid application step), a step of adjusting the component B deposited on the fiber bundle, to have a viscosity of 100 poises or less, for impregnation deep inside the fiber bundle, to form a composite (hereinafter called the aid impregnation step), and a step of arranging the component C heated and molten to have a viscosity of 500 poises or more, to contact the continuous composite (hereinafter called the matrix arrangement step). It is desirable that these three steps are carried out continuously, but these three steps can also be carried out discontinuously, that is, by once winding the composite around a bobbin, etc. after the aid impregnation step, and subsequently feeding the composite through the matrix arrangement step in off-line. It is more desirable that the aid application step and the aid impregnation step can be carried out simultaneously by one apparatus.

The aid application step can be carried out by using a publicly known production method of applying an oil, sizing agent or matrix resin to a fiber bundle. For example, on the surface of a heated rotating roll, the molten component B is formed as a film with a certain thickness (coating), and a fiber bundle (component A) is fed to run in contact with it, for depositing the component B by a predetermined amount per unit length of the fiber bundle. The coating of the roll surface with the component B can be realized by applying the concept of a publicly known coater such as reverse roll, regular rotation roll, kiss roll, spray, curtain, extrusion, etc. Devices for coating on a roll are described in detail in "Introduction to Coaters and Operation Techniques" (Gijutsu Sogo Center), etc.

If these techniques are applied, the heated and molten component B can also be directly applied, not on the roll surface, to a running fiber bundle using any of various coaters. For example, while the component B is extruded in a certain quantity per unit time from a nozzle, a fiber bundle running at a constant speed can be brought into contact with the nozzle. It is not necessarily required that the nozzle and the fiber bundle contact each other perfectly, and simply by letting the fiber bundle run near the nozzle, coating can be achieved.

In the aid impregnation step, at the temperature at which the component B is molten, the component A with the component B deposited is rubbed by bars, or is repetitively spread and collected, or pressurized or vibrated, to impregnate the component B deep inside the fiber bundle (component A). For example, the fiber bundle is fed in contact with the surfaces of a plurality of heated rolls or bars, to be spread. In this case, unless the viscosity of the molten component B is kept at 100 poises or less by adjusting the temperature, the fiber bundle cannot be impregnated with the component B at a high speed.

In the matrix arrangement step, the molten component C having a viscosity of 500 poises or more is arranged to contact the composite. For example, an extruder and a coating die used for electric wire covering can be used to arrange the component C around the continuous composite as if covering. As another method, the molten component C formed like a film by an extruder and T die is arranged on one side or both sides of the composite flattened by rolls, etc., and they are integrated by rolls, etc.

The molding material produced may be cut at a certain length by such an apparatus as a pelletizer or strand cutter, for use. The cutting step may be continuously arranged downstream of the matrix arrangement step. If the molding material is flat or a sheet, it can be slit slenderly and cut. A sheet pelletizer for simultaneous slitting and cutting can also be used.

For producing the above mentioned thermoplastic yarn prepreg, in succession to the matrix arrangement step, for example, the arranged matrix resin (component C) can be molten, and mixed with the component B using a heat roll press, etc. for continuous impregnation into the component A, and the entire composition can be flattened in section.

The polyamide based resin composition of the present invention is described below. The resin composition of the present invention consists of at least the following two components. The component D is an oligomer obtained by condensation of phenol or a phenol derivative (precursor a) and an aliphatic hydrocarbon with two double bonds (precursor b), and the component E is a polyamide resin. The composition can also contain reinforcing fibers.

The component D in this case corresponds to a preferable embodiment of the component B. The component D has a relatively low molecular weight and a very low viscosity. So, when it is added to the component E, it makes the resin composition highly flowable. Especially when the resin contains a filler such as reinforcing fibers or flame retardant, etc. and is very poor in flowability, the added component D can improve flowability at the time of hot melting, to improve moldability. In general, if a low molecular material is added to a resin, it may happen that the mechanical properties of the resin greatly decline compared to those before addition. However, the resin composition of the present invention undergoes very small decline of properties.

Against 100 parts by weight in total of the resin composition of the present invention, the component D is added by 0. 5 to 40 parts by weight. If the amount is smaller than 0.5 part by weight, the effect of improving the flowability is small, and if more larger than 40 parts by weight, the mechanical properties of the resin composition greatly decline. A more desirable range is 5 to 15 parts by weight.

Against 100 parts by weight of the resin composition, reinforcing fibers can be added by 5 to 200 parts by weight. Since the component D is contained, the flowability of the resin composition is relatively good, even if reinforcing fibers are contained. If the amount of reinforcing fibers is smaller than 5 parts by weight, the fiber reinforcing effect is small, and if larger than 200 parts by weight, flowability and moldability are poor even if the component D is contained. A more desirable range of reinforcing fiber content is 10 to 70 parts by weight.

The kind of reinforcing fibers is not especially limited. Fibers with a high strength and high elastic modulus such as carbon fibers, glass fibers, polyaramid fibers, alumina fibers, silicon carbide fibers and boron fibers can be used. Two or more kinds of them can also be used as a mixture. Among them, carbon fibers are preferable since they are excellent in the effect of improving mechanical properties.

It is more preferable that the surface chemical function (O/C) as the ratio of the number of oxygen (O) atoms to the number of carbon (C) atoms on the fiber surfaces measured by the X-ray photoelectron spectroscopy is in a range of 0.05 to 0. 4.

The component D is described below. The component D is an oligomer obtained by the condensation reaction between phenol or a phenol derivative (precursor a) and an aliphatic hydrocarbon with two double bonds (precursor b).

It is preferable that the weight average molecular weight of the component D is 200 or more, to prevent the molded product from being easily volatilized to form such defects as voids when heated or that the physical properties of the resin composition decline. On the other hand, if the molecular weight is too large, the melt viscosity becomes high. To effectively improve the flowability of the resin composition, it is preferable that the molecular weight is 1000 or less. The weight average molecular weight in this case is measured according to the gel permeation chromatography (GPC) using a low angle light scattering photometer (LALLS).

The polyamide resin as the component E is not especially limited as far as it is a polymer with its main chain formed by repeating an amido group, and aliphatic polyamides such as nylon 6, nylon 66, nylon 11, nylon 610, nylon 612 and dimeric acid based polyamides, aromatic polyamides such as nylon 6T, etc. can be used. Any of their mixtures or a copolymer consisting of a plurality of polyamides such as nylon 6 nylon 66 copolymer can also be used. Also a polymer having another kind of a molecule connected to a polyamide by the addition reaction or condensation reaction participated in by amido groups or graft reaction to methylene groups, etc. can also be used. Among polyamides, nylon 6, nylon 66 and nylon 6 nylon 66 copolymer are especially suitable since they have excellent mechanical properties.

The resin composition of the present invention can contain a flame retardant, weathering improver, antioxidant, thermal stabilizer, ultraviolet light absorber, plasticizer, lubricant, colorant, compatibility improver, conductive filler, etc.

The resin composition of the present invention is not especially specified in the mixing degree so long as the mixing ratio is in said range. A composition having the respective components almost homogeneously dispersed by kneading or a separate type composition, in which the component E is arranged in contact with reinforcing fibers impregnated with the component D can also be used. In this case, the component D functions also as an aid for allowing the reinforcing fibers to be easily impregnated with the component E when the fiber reinforced resin composition is molded.

The molding material and resin composition described above can be processed into products with a final form by ordinary molding. The molding methods which can be used include press molding, transfer molding, injection molding, and their combinations. The molded products which can be produced include automobile parts such as cylinder head covers, bearing retainers, intake manifolds and pedals, tools such as monkey spanners, and small articles such as gears. Since the molding material of the present invention is excellent in flowability, molded products as thin as 0. 5 to 2 mm can be easily obtained. Products requiring such thin molding include parts of electric and electronic apparatuses such as housings used for personal computers and mobile phones and keyboard supports inside personal computers. For the parts of electric and electronic apparatuses, if conductive carbon fibers are used as the reinforcing fibers, it is desirable that they can shield electromagnetic waves.

The above molding material and resin composition can be used as pellets to be injection-molded. In injection molding, when the molding material provided as pellets is plasticized, it is heated, pressurized and kneaded. So, according to the present invention, the component B or D manifests a large effect as a dispersion and impregnation aid. In this case, an ordinary inline screw type injection molding machine can be used. Furthermore, even when the kneading effect by a screw is weak because of the use of a screw shaped to have a low compression ratio or because of setting a low back pressure for material plasticization, the reinforcing fibers are well dispersed into the matrix resin, to provide a molded product containing fibers well impregnated with a resin.

EXAMPLES

Example 1

On a roll heated at 130° C., a heated and molten liquid of a terpene phenol oligomer (YP90L addition product of monocyclic monoterpene and phenol with a weight average molecular weight of 460, produced by Yasuhara Chemical K.K.) was formed into a film. A kiss coater was used to form the film with a certain thickness on the roll. On the roll, a continuous carbon fiber bundle ("Torayca" T700SC produced by Toray Industries, Inc., consisting of 12,000 carbon fibers with a single fiber fineness of 0.6 denier) was fed in contact with it, to deposit a certain amount per unit length of the carbon fiber bundle upon the terpene phenol oligomer.

The carbon fibers deposited upon the oligomer were fed alternately over and under ten rolls having diameters of 50 mm heated to 180° C., freely rotated upon bearings and arranged on a straight line. This operation caused the oligomer to be impregnated deeply inside the fiber bundle, to form a continuous composite consisting of carbon fibers and terpene phenol oligomer. At this stage, the amount of the oligomer was 15 wt % based on the weight of the entire composite. The specific gravity of the carbon fibers was 1.80 and the specific gravity of the terpene phenol oligomer was 1.06. So, the volumetric content of the carbon fibers in the entire composite was 76.8%. The melt viscosity of YP90L at 130° C. at a shear rate of $10^3 s^{-1}$ measured by a capillary rheometer was about 10 poises.

The continuous composite was fed through a coating die for electric wire covering installed at the tip of a single screw extruder with a diameter of 40 mm, and nylon 6 resin ("Amilan" CM1017 produced by Toray Industries, Inc. with a weight average molecular weight of 18,600) molten at 240° C. was discharged into the die from an extruder, to be continuously arranged to cover the surrounding of the composite. The melt viscosity of nylon 6 at 240° C. at a shear rate of $10^3 s^{-1}$ measured by a capillary rheometer was about 2000 poises.

The molding material obtained by coating the composite with nylon 6 was cooled to about room temperature, and cut at a length of 7 mm by a strand cutter. The production of the molding material was continuous, and the carbon fiber bundle take-up speed was 30 m/min.

The pellets were used to obtain a molded sheet having dimensions of 150 mm×150 mm×1 mm by an injection molding machine having a mold clamping force of 100 tons. In this molding, the cylinder temperature was set at 250 ° C. at a portion close to the nozzle, and the mold temperature was 70° C. The molded product had a smooth surface, and there was no problem with the dispersibility of fibers in the molded product. A section of the molded product was observed by a microscope, and the absence of voids was confirmed.

The composition of the molded product was carbon fibers:terpene phenol oligomer:nylon 6 resin=35:6:59.

The notched Izod impact value of the molded product was 21 kgf cm/cm.

Comparative Example 1

The same continuous carbon fiber bundle as used in Example 1 was fed through a coating die for electric wire covering installed at the tip of a single screw extruder with a diameter of 40 mm, and nylon 6 resin ("Amilan" CM1017 produced by Toray Industries, Inc.) molten at 240° C. was discharged into the die from an extruder, and was continuously arranged to coat the surrounding the composite.

The molding material in which the carbon fiber bundle was coated with nylon 6 was cooled to about room temperature, and cut at a length of 7 mm by a strand cutter, to make pellets to be injection-molded. The carbon fiber bundle take-up speed was 30 m/min.

The pellets were used to obtain a molded sheet having dimensions of 150×150 mm×1 mm by an injection molding machine with a mold clamping force of 100 tons. The same molding conditions as used in Example 1 were used. The material had insufficient flowability, and the molded product was partially insufficiently shot at a portion apart from the gate of the mold. On the surface of the molded product, an unopened and unimpregnated fiber bundle was exposed, and a wale was formed in the portion. A section of the molded product was observed under a microscope, and an unopened and unimpregnated fiber bundle and voids were observed.

The composition of the molded product was carbon fibers:nylon 6 resin=35:65.

The notched Izod impact value of the molded product was 25 kgf cm/cm.

Industrial Applicability

The molding material of the present invention is easy to produce, and when molded by injection molding, etc., the reinforcing fiber bundle can be well dispersed in the molded product. Furthermore, the polyamide based resin composition of the present invention has excellent flowability. Moreover, molded products with excellent quality can be obtained from them.

What is claimed is:

1. A molding material comprising a composite A+B contacted to a component C, said composite comprising a continuous reinforcing fiber bundle A dispersed in a thermoplastic polymer B or oligomer B having a weight average molecular weight of 200 to 50,000 and a thermoplastic resin C intimately adhered to said composite A+B;

wherein said resin C has a predetermined melt viscosity and a weight average molecular weight of 10,000 or more, and wherein said thermoplastic polymer B or oligomer B has a melt viscosity that is lower than said melt viscosity of said thermoplastic resin C.

2. A molding material, according to claim 1, wherein the molding material is cut to a length of 1 to 50 mm.

3. A process for producing the molding material stated in any one of claims 2, comprising the steps of impregnating said continuous reinforcing fiber bundle A with said thermoplastic polymer B or oligomer B heated and molten to a viscosity of 100 poises or less, to form composite A+B; arranging said component C in molten condition having a viscosity of 500 poises or more, causing said component C to contact said composite A+B; cooling the resulting material to room temperature; and cutting the product to a length of 1 to 50 mm.

4. A molding material, according to claim 1, wherein the component C is arranged to surroundingly cover said composite A+B.

5. A molding material, according to claim 4, wherein the molding material is cut to a length of 1 to 50 mm.

6. Pellets to be injection-molded, comprising the molding material stated in any one of claims 2 and 5.

7. A molded product, obtained by injection-molding the pellets to be injection-molded stated in claim 6.

8. Pellets to be injection-molded, comprising the polyamide based resin composition stated in claim 6.

9. A molded product, obtained by injection-molding the pellets to be injection-molded stated in claim 8.

10. A molding material, according to claim 1, wherein the component C is arranged as a layer attached to said composite A+B.

11. A molding material, according to claim 10, wherein the molding material is cut to a length of 1 to 50 mm.

12. A molding material, according to claim 1, wherein the melt viscosity of the thermoplastic polymer B or oligomer is 100 poises or less, and the melt viscosity of the component is 500 poises or more.

13. A molding material, according to claim 1, wherein the absolute value of the difference between the solubility parameter δ1 of the thermoplastic polymer B or oligomer and the solubility parameter δ2 of the component is smaller than 3.5.

14. A molding material, according to claim 1, wherein when the content of the thermoplastic polymer B or oligomer B in the molding material is 10 wt %, the Izod impact value of the molded product obtained by molding the molding material accounts for 60% or more of the Izod impact value of the molded product obtained when excluding the thermoplastic polymer B or oligomer B from the components of said molding material.

15. A molding material, according to claim 1, wherein the volumetric content of the said continuous reinforcing fiber bundle in the composite A+B is 40 to 95%.

16. A molding material, according to claim 1, wherein the void volume of the composite A+B is 0 to 40%.

17. A molding material, according to claim 1, wherein the component is a polyamide, polyolefin, polycarbonate, or any of the mixtures and copolymers comprising two or more of them.

18. A molding material, according to claim 1, wherein the thermoplastic polymer B or oligomer B is an oligomer obtained by adding phenol or a phenol derivative, referred to herein as precursor a, and an aliphatic hydrocarbon having two double bonds referred to herein as precursor b.

19. A molding material, according to claim 18, wherein said precursor b is an aliphatic hydrocarbon having 6 to 15 carbon atoms and two double bonds.

20. A molding material, according to claim 19, wherein said precursor b has one or more cyclic structures.

21. A molding material, according to claim 20, wherein said precursor b is dicyclopentadiene or monocyclic monoterpene represented by the molecular formula $C_{10}H_{16}$.

22. A molding material, according to claim 18, wherein at least 40 wt % or more of said component B comprises one molecule of said precursor b added to two molecules of said precursor a.

23. A molding material, according to claim 18, wherein the weight average molecular weight of said thermoplastic polymer B or oligomer comprises 200 to 1000.

24. A molding material, according to claim 1, wherein said component comprises nylon 6, nylon 66 or nylon 6 nylon 66 copolymer.

25. A molding material, according to claim 1, wherein the thermoplastic polymer B or oligomer component B is an oligomer obtained by adding phenol or a phenol derivative, and an aliphatic hydrocarbon with two double bonds, and wherein said component C is nylon 6, nylon 66 or nylon 6 nylon 66 copolymer.

26. A molding material, according to claim 25, wherein said aliphatic hydrocarbon with two double bonds is an aliphatic hydrocarbon having 6 to 15 carbon atoms.

27. A molding material, according to claim 26, wherein said aliphatic hydrocarbon with two double bonds has one or more cyclic structures.

28. A molding material, according to claim 27, wherein said aliphatic hydrocarbon with two double bonds is dicyclopentadiene or monocyclic monoterpene represented by the molecular formula $C_{10}H_{16}$.

29. A molding material, according to claim 25, wherein at least 40 wt % of said thermoplastic polymer B or oligomer B comprises a composition having one molecule of said aliphatic hydrocarbon with two double bonds added to two molecules of said phenol or phenol derivative.

30. A molding material, according to claim 25, wherein the weight average molecular weight of said thermoplastic polymer B or oligomer is 200 to 1000.

31. A molding material, according to claims 1, wherein said fibers of the said continuous reinforcing fiber bundle are carbon fibers.

32. A molding material, according to claim 1, wherein said fibers of said continuous reinforcing fiber bundle A are carbon fibers having 0.05 to 0.4 surface chemical function (O/C) comprising the ratio of the number of oxygen (O) atoms to the number of carbon (C) atoms of the fiber surfaces, as measured by X-ray photoelectron spectroscopy.

33. A process for producing a molding material defined in any one of claims 1, 4 and 10, comprising the steps of impregnating said continuous reinforcing fiber bundle A with said thermoplastic polymer B or oligomer B heated and molten to a viscosity of 100 poises or less, to form said composite A+B; arranging said component C in molten condition having a viscosity of 500 poises or more, causing said component C to contact said composite A+B; and cooling the resulting material to room temperature.

34. A molded product, obtained by molding the molding material stated in claim 1.

35. A molded product, obtained by molding the polyamide based resin composition stated in claim 17.

* * * * *

UNITED STATES PATENT AND TRADEMARK OFFICE
CERTIFICATE OF CORRECTION

PATENT NO.     : 6,455,143 B1
DATED          : September 24, 2002
INVENTOR(S)    : Ishibashi et al.

It is certified that error appears in the above-identified patent and that said Letters Patent is hereby corrected as shown below:

<u>Column 10,</u>
Line 56, please insert -- $\alpha$ -- after "Mg K".

Signed and Sealed this

Twenty-seventh Day of January, 2004

JON W. DUDAS
*Acting Director of the United States Patent and Trademark Office*